(12) United States Patent
Boezaart

(10) Patent No.: US 7,980,456 B2
(45) Date of Patent: Jul. 19, 2011

(54) PACE CAPTURE DEVICE FOR ASSISTING WITH A SPORTING ACTIVITY

(76) Inventor: Andre P. Boezaart, Gainesville, FL (US)

( * ) Notice: Subject to any disclaimer, the term of this patent is extended or adjusted under 35 U.S.C. 154(b) by 510 days.

(21) Appl. No.: 12/112,497

(22) Filed: Apr. 30, 2008

(65) Prior Publication Data
US 2008/0310579 A1 Dec. 18, 2008

Related U.S. Application Data

(60) Provisional application No. 60/943,435, filed on Jun. 12, 2007.

(51) Int. Cl.
*G07C 9/00* (2006.01)
(52) U.S. Cl. ............ 235/95 C; 702/160; 473/223
(58) Field of Classification Search ............ 235/95 C; 702/160; 473/223
See application file for complete search history.

(56) References Cited

U.S. PATENT DOCUMENTS

| 2008/0085778 A1* | 4/2008 | Dugan | 473/223 |
| 2010/0057398 A1* | 3/2010 | Darley et al. | 702/160 |

* cited by examiner

*Primary Examiner* — Karl D. Frech
(74) *Attorney, Agent, or Firm* — Timothy J. Bechen; Williams Mullen

(57) ABSTRACT

The present invention includes a system and method for monitoring a user's pace and providing an indication of the user's average pace in conjunction with performing an activity. The method according to one embodiment of the present invention includes monitoring a user's pace relating to the performance of the activity and calculating pace data relating the user. In response to a first signal, the method stores the pace data and in response to a second signal retrieves the pace data. The method then calculates an assistance pace for the user over a defined time interval and transmits an output signal reflecting the assistance pace based the pace data, such as in the example of a golf club assisting in the swinging pace of the golf club.

11 Claims, 2 Drawing Sheets

PACE CAPTURE DEVICE FOR ASSISTING WITH A SPORTING ACTIVITY

PRIORITY CLAIM

This application claims the benefit of U.S. Provisional Application No. 60/943,435, entitled "PACE CAPTURE DEVICE FOR ASSISTING WITH A SPORTING ACTIVITY", filed on Jun. 12, 2007, which hereby are incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to monitoring a user's pace and providing an indication of the user's average pace in conjunction with performing an activity.

BACKGROUND OF THE INVENTION

The concept of tempo and rhythm is a fundamental concept in many athletic activities such as golf, running, cycling or any sport involving rhythmic movements. In golf, when players are playing well, they are known to have good "tempo" or "rhythm" or "timing" and when not, it is that they have bad "rhythm" and their "timing of the shot/ball" is off. Also, you often hear athletes saying that they work on their "tempo" or "timing".

Every person has his or her own natural beat or rhythm. Typically, each individual is generally unaware of this rhythm. This is unique for every human being, and even if they want to move faster or slower, the beat stays the same, but the lengths of the activity, e.g. strides, get longer or shorter. Additionally, if people have to adapt to the rhythm or beat of someone else, for instance small people or children walking with larger people or adults, they become very uncomfortable and fidgety and "dysrhythmic".

In the realm of athletics, and in rhythmic activities in general, the aspects of individual tempo play an important role. For example, golfers Tiger Woods, Retief Goosen and Ernie Els walk at tempos of 108, 100 and 95 paces per minute, respectively, and additionally each golfer drives, chips and putts at approximately the same tempo. If, however, they hit a rare mis-hit, the tempo went faster, thus varying from their average pace. Needless to say, these players very seldom go out of step with their natural tempo. That is an inbred phenomenon brought about by natural ability, instinct and many thousands of hours of practice. Thus it is clear that the average tempo of an individual and the concordance of an activity tempo with that tempo are vital to enhanced performance of an individual.

BRIEF DESCRIPTION OF THE INVENTION

The present invention provides for allowing a user, such as an athlete, e.g. a golfer to improve his/her game by coordinating his or her activity pace consistent with his or her natural individual rhythm, tempo or pace. One aspect of the invention is that, for example, the golfer's ability closely relates to the golfer's natural personal rhythm or current state while playing the round of golf. Another example can be a runner having a running pace or a cyclist having a cycling cadence. While the rest of the description of this invention uses these examples, the invention is applicable to all types of activities, including sport from baseball, to hockey players to equestrian sport, not specifically excluding any particular sport. It may even be applicable in non-sporting situations, such as business negotiations.

Golfers might have a personal individual inborn natural undamped rhythm or tempo, or different states on different rounds. The natural rhythm is reflected in the golfer's walking pace when his or her attention is on something else, like the golf game itself for example, and one way of determining the golfer's natural rhythm or state is by monitoring the pace at which the golfer walks during the round. In one embodiment, the present invention captures the golfer's walking pace, i.e. his or her natural inborn rhythm, and makes this pace available as a swing aid.

Generally speaking, the present invention includes a pace capturing device, such as in one example a pedometer or other type of walking pace measuring device. This device records the golfer's walking pace (steps or beats per minute) for a defined interval or period of time. For example, the pace may be measured for a single round of golf, for a first couple holes in the round of golf, for numerous rounds of golf, etc.

The measuring pace is then stored and can be processed as needed. For example, if the pace relates to numerous rounds of golf, they may be averaged over the various rounds of golf. It is also recognized that in order to measure and translate the pace, the pedometer also records information regarding when the walking activity occurs, to possibly distinguish between when a golfer is milling around a tee box prior to teeing off and when the golf is walking down the fairway (or the rough) to approach a next shot.

The golfer's pace, after being processed, is made available as a swinging enhancement for the golfer. In various embodiments described below, the pace can be translated into a rhythmic (tempo) tool to allow the golfer to pace the swing of the club in his or her natural personal inborn rhythm or pace. One example is an audio device that transmits a beeping or clicking noise to act similar to a metronome in the swing process. Another example is to play music back at the player at exactly the similar tempo (say 108 beats per minute) as the player's natural tempo. The playing of music could be used in business or other negotiation situations, by playing soft background music in or out of the opponent's natural rhythm and by that setting his or her comfort level depending on the situation at hand.

Therefore, based on the determination of a user's pace, an output signal can assist with the user with the timing or rhythm of the performance of an activity.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
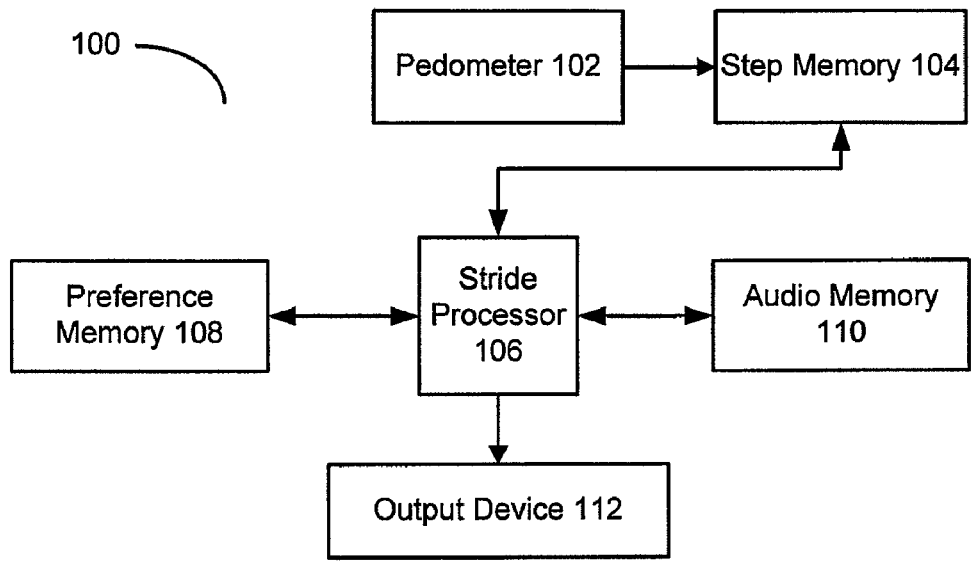
FIG. 1 presents a block diagram illustrating a system for monitoring a user's pace and providing a pace output.

FIG. 1 presents a block diagram depicting a system for monitoring a user's pace and providing a pace output. According to the embodiment illustrated in FIG. 1, a system 100 includes a pace determining device 102 (generally referred to as a pedometer in FIG. 1), step memory 104, a stride processor 106, preference memory 108, audio memory 110 and an output device 112. System 100 may be designed to operate as a waist-clipped computer. In an alternative embodiment, system 100 may be distributed across multiple devices. For example, the pace determining device 102 may be located on the foot of a user and stride processor 106 may be a separate device wirelessly connected to the pace determining device 102.

As illustrated in FIG. 1, a pace determining device 102 is operable to monitor the pace of a user. In a preferred embodiment, pace determining device 102 may include a standard pedometer as known in the art. For example, a pace determining device 102 may include a device containing a spring-set arm that fluctuates based upon the movement of a user. Alternatively, a pace determining device 102 may include an accelerometer. In a preferred embodiment, the device 100 may be worn by a user, such as on a belt of a user. In such an embodiment, the pace determining device 102 is operable to monitor the movement of a user's hips to determine the walking pace of the user. The inner mechanics of pace determining device 102 to measure the walking pace are well known in the art and are not described in greater detail for brevity purposes only.

Pace determining device 102 is communicatively coupled to step memory 104. Step memory 104 may include any memory device known in the art, such as flash memory, EEPROM or any other non-volatile memory by way of example. Step memory 104 is operable to store data pertaining to the stride of a user. In one embodiment, pace determining device 102 may be operable to dynamically update the average stride of a user and store data related in the step memory 104. For example, step memory 104 may contain a real-time average stride rate of a user. Pace determining device 102 may be operable to retrieve the current average stride rate of a user and update the current average stride rate each time the pace determining device 102 detects a stride.

In an alternative embodiment, pace determining device 102 may calculate the stride rate of a user as a batch process. For example, pace determining device 102 may include a small volatile memory (such as a small RAM chip) that stores "session" stride data related to a user. The step memory 104 may simultaneous contain the overall average stride rate of a user. While the pace determining device 102 is active, current stride rate data is stored within the pedometer's 102 local memory storage. Upon the powering off of the pace determining device 102, the pace determining device 102 may be operable to retrieve the average stride rate from the step memory 104 and determine an updated average stride rate as a combination of the retrieved average stride rate and the session stride rate.

Alternatively, or in conjunction with the foregoing, a "tempo of day" may be computed along with the average lifetime stride tempo of the user. That is, in addition to storing the lifetime stride data corresponding to a user, a second data storage location may be utilized to store the average pace of a user. In a preferred embodiment, this functionality would allow a user to save a preferred stride tempo, for example, a stride tempo on a good day of golf, and re-use this tempo at a later time.

Pace determining device 102 and step memory 104 act as the "data gathering" component of system 100. That is, pace determining device 102 and step memory 104 are capable of acting independently of the remaining system 100.

Stride processor 106 forms the core of the data processing of the system 100. As illustrated, stride processor 106 is operable to retrieve stride data from step memory 104. As previously described, step memory 104 contains data including at least the average stride rate of a user over a different time period, e.g. a current round of golf. In a preferred embodiment, stride processor 106 is operable to retrieve the stride data from step memory 104 and store a copy of the data in a local memory, such as a register file, RAM or any other memory device common in the art. Stride processor 106 stores the average stride rate of a user in local memory for use in outputting a signal corresponding to the step data, as will be described further.

System 100 further includes a preference memory 108. Preference memory 108 may store a plurality of data used in configuring stride processor 106. Preference memory 108 may store data including, but not limited to, output intensity (volume, luminescence, etc.), sound options, output color, output device, output mode, etc. For example, preference memory 108 may store a user profile configuring the processor to output a standard "beep" at 70 dB as well as a vibrating frequency or music tempo. The data stored in preference memory 108 may be obtained from a plurality of sources including, but not limited to, a GUI present on the device, a plurality of input objects such as buttons present on the device or a GUI provided on a personal computer via a wired and/or wireless connection to the device.

As briefly mentioned, stride processor 106 may be operative to generate a periodic audio signal based upon the stride rate retrieved from step memory 104. In a particular embodiment, an audio file may be stored within audio memory 110. Stride processor 106 may be operable to retrieve audio data from memory 110 and repeat the audio data at a frequency corresponding to the stride rate. For example, a stride rate of 60 paces per minute (1 pace per second) may be stored within step memory 104. Stride processor 106 may be operable to retrieve audio data from audio memory 110 and repeat this data a frequency of 1 Hz, or one repetition per second.

Once the stride processor 106 retrieves the stride data from step memory 104 and audio data from audio memory 110, the output is routed to an output device 112. In a one embodiment, an output device 112 may include a small speaker and a vibrating device such as a small electronic motor including an unbalanced mass on a driveshaft. Alternatively, or in conjunction with the foregoing, the output device may be configured to output music to a user via a speaker or via an audio output jack. In one embodiment, stride processor 106 may be operative to retrieve audio from audio memory 110 and modify the retrieved audio in accordance with the retrieved stride data. For example, stride processor 106 may be operative to modify the tempo of the retrieved audio data to match the stride data. In one embodiment, stride processor 106 may modify the beats per minute (BPM) of the retrieved audio data to match the stride data. In one embodiment, stride processor 106 may analyze a plurality of audio data to determine the base BPM of the audio data and may select audio data having a BPM equal to the stride data. In an alternative, the stride processor 106 may stretch or "beat match" audio data to existing stride data. That is, stride data may indicate a user's stride may be 128 steps per minute and may locate audio having a BPM of 130 BPM. The stride processor 106 may then adjust the BPM of the audio data to 128 BPM to match the stride data.

Figure 2:
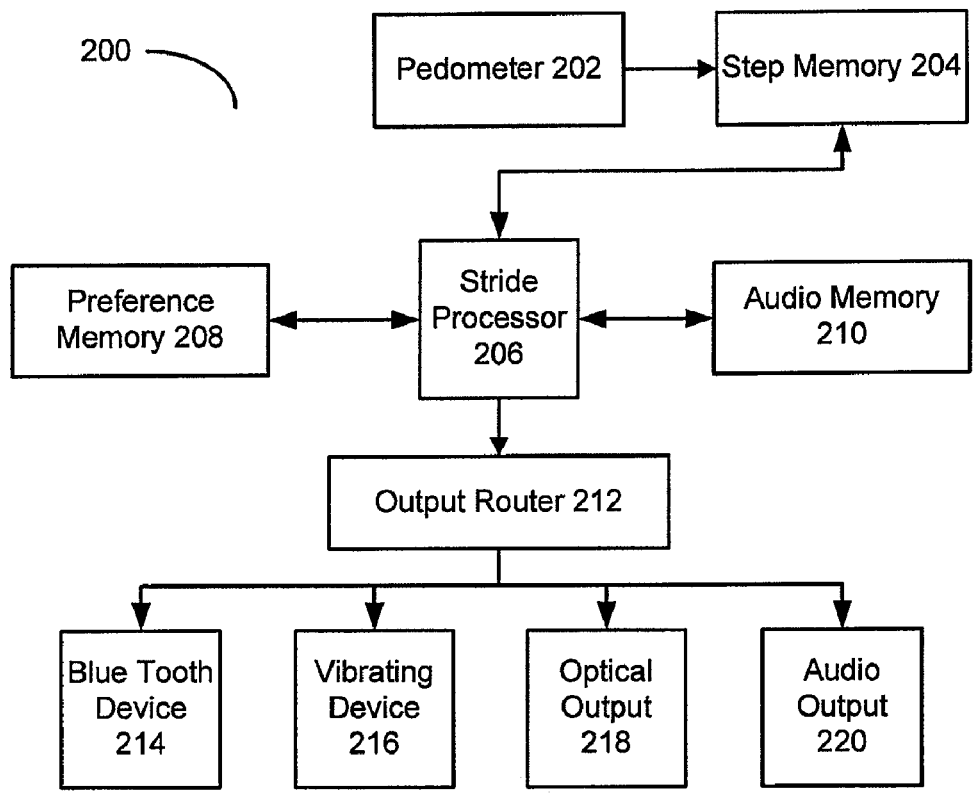
FIG. 2 presents a block diagram illustrating an alternative embodiment of a system for monitoring a user's pace and providing a pace output.

FIG. 2 presents a block diagram depicting an alternative embodiment of a system for monitoring a user's pace and providing a pace output. According to the embodiment illustrated in FIG. 1, a system 200 includes a pace determining device 202, step memory 204, a stride processor 206, preference memory 208 and audio memory 210, an output router 112 and a plurality of output devices 214-220. In a preferred embodiment, components 202-210 are structurally similar to components 102-110 in FIG. 1, and will not be repeated for brevity.

FIG. 2 includes an output router 212, operable to route an output signal to a plurality of output devices 214-220. In a preferred embodiment, stride processor 206 may be operable to transmit an output signal corresponding to an average stride rate. Additionally, stride processor 206 may be operable to transmit a control signal indicating which device 214-220 to transmit the output signal to. In a preferred embodiment, the control and data signals sent by stride processor 206 may be combined, such as on a bus. In alternative embodiments, the control and data signals may be present on independent busses.

Output router 212 receives the output signal and control signal from stride processor 206 and routes the output signal appropriately. As illustrated, a plurality of devices 214-220 may be connected to the output router 212. Output devices 214-220 may include, but are not limited to, a wireless device 214, a vibrating device 216, an optical output 218 or an audio output 220.

A wireless device 214 may be communicatively coupled to output router 212 and operable to receive an output signal from stride processor 206. For example, a wireless device 214 may include a wireless enabled headset, as known in the art. Stride processor 206 may be operable to output an audio signal to the wireless headset attached to a user's ear. The headset would then be operable to output a rhythmic pulse corresponding to the user's average stride rate.

A vibrating device 216 may further be communicatively coupled to the output router 212 and operable to receive an output signal from stride processor 206. In a preferred embodiment, vibrating device 216 may be located within the same housing as the remainder of the system 200. This housing may be attached to a user via an attachment device, such as a clip attached to the user's belt. Upon receiving an output signal from output router 212, vibrating device 216 may be operable to convert the output signal to a signal operable to activate an electric motor containing an unbalanced weight. The converted signal may be operable to rotate the electric motor at a frequency corresponding to the frequency of a user's average stride rate.

Optical and audio outputs 218 and 220, respectively, may further be coupled the output router 212 and operable to receive an output signal from stride processor 206. In a preferred embodiment, an optical output 218 may include an LED or similar device, capable of displaying a visible light to a user. The light provided by optical output 218 may be controlled via an electrical switch allowing the output 218 to flash in sync with the received output signal. In a preferred embodiment, an audio output 218 may include an audio output jack such as a ¼ inch or ⅛ inch output, although any output mechanism known in the art may be utilized. As previously described, an output signal routed to output devices 214-220 may include an audio signal having the same frequency as a user's average stride rate. An audio output 220 may be operable to receive the output signal and forward the output signal through an output jack. An output jack may be connected to plurality of devices including, but not limited to headphones or a small speaker.

It should be noted that although each output device 214-220 has been described as functioning independently, any number of output devices 214-220 may be used in conjunction with one another. For example, wireless device 214 may be utilized alongside vibrating device 216. That is, a user may utilize a wireless headset outputting an audio signal alongside a vibrating device outputting a vibrating pattern having the same frequency of the audio signal, this frequency corresponding to the average stride rate of a user. In an alternative embodiment, outputting an audio signal may include communicating with an MP3 player or similar portable electronic device and providing an output paced consistent with the rhythm as described above.

Figure 3:
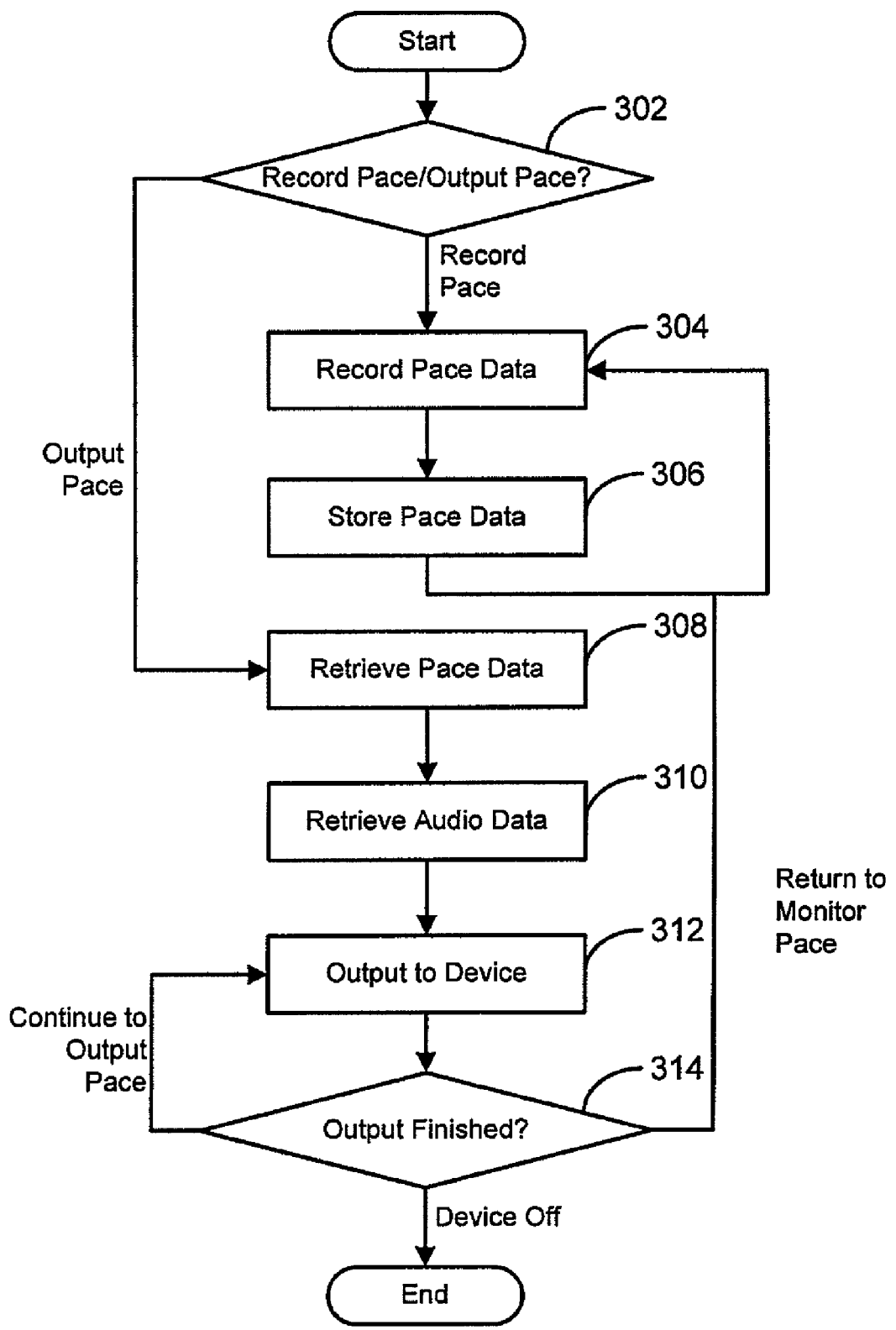
FIG. 3 presents a flow diagram illustrating a method for monitoring a user's pace and providing a pace output.

FIG. 3 illustrates a flow diagram illustrating a method for monitoring a user's pace and providing a pace output. As illustrated, a determination is made as whether the method should monitor the pace of a user or output the pace data to a user, step 302. In a preferred embodiment, this decision may be made actively by a user performing the method illustrated in FIG. 3. For example, a user may provide a signal indicating which action should be chosen, such as a signal activated by a switch.

If a decision is made to record the pace of a user, pace data is recorded, step 304. In one embodiment, recording pace data may include dynamically updating the average stride of a user. For example, a pace data store may contain a real-time average stride rate of a user. Recording pace data may include retrieving the current average stride rate of a user and updating the current average stride rate each time a user takes a step.

Upon the recording of pace data, the data is stored, step 306. Continuing the previously example, upon detecting a user has taken a step, the average stride rate may be recalculated and stored again. Alternatively, steps 304 and 306 may include a batch process wherein the recording of pace data (304) includes recording pace data for a "session", a session including a time interval defined by two distinct and clear endpoints, such as the powering on and off of a device. After a session ends, the session pace data may be combined with total pace data to form final, new total pace data.

After the pace data is stored (306), the process returns to 302 to determine whether the process should continue recording the user pace, or to output the pace. If a determination is made to output the pace data, the pace data is retrieved, step 308. The pace data retrieved in step 308 corresponds to the pace data stored during step 306. In response to the retrieval of pace data (308), audio data may be retrieved 310. In a preferred embodiment, audio data may include a tone or sound file stored within an external memory.

After both pace and audio data are retrieved (308, 310), a data is outputted to a device, 312. In a preferred embodiment, the data output to a device may include an audio signal, although alternative embodiments exist wherein the data output to a device includes an optical signal or a vibrating tone or a combination thereof. A signal is output to a device at a regular frequency corresponding to the stride frequency of a user until a signal is received to end the output, 314. If a signal is received to end the output, a decision is made to determine whether the device is to be powered off or if the mode must be switched to record pace data. If the mode is set to record pace data, the process returns to step 304, if the device is to be powered off, the processes ends.

In another embodiment, predetermined tempos may be programmed into the system, where the tempos reflect various levels of the same user or the tempos of different users. In the example of golf, suppose a golfer wants to emulate another golfer's swing, they can listen to the other golfer's pacing to assist in the timing of the swing by selecting the other golfer's pace.

As described above, the output is then usable by a golfer to assist in the timing of the golf swing. The user, through practice, can learn to use the pacing guidance in the timing of his or her golf swing. Alternatively, the output of the present invention may be used to provide a rhythmic cadence for any activity prone to rhythmic motion such as running, cycling, rowing, etc.

It is also recognized that the present invention is not specifically limited to the embodiment of a golf device, but rather is generally described in the golfing embodiment. It is recognized that the present invention is also usable in any suitable sport or other activity where user pace may be measured and a timing-based activity occurs.

For example, in another embodiment, the pace assistance may relate to running, where a user includes a sensor that is placed near, on or inside the runner's shoe, the sensor recording foot strike information. A wrist band or other central processing component may wirelessly communicate with the sensor to receive the foot strike or pace information perform the above-described techniques for recording and/or monitoring pace information. While in one embodiment, the processing device might provide direct user feedback with pace information, it is also recognized that this pace information may be usable to record or otherwise track the user's rhythm relative to the current activity. For example, suppose a runner is running a race, for example a 5K race, and sets a personal record, the user may record the average pace run to set this personal record. Or in another example, the user may simply have a really great training run and wish to capture the pace for this particular training run.

Using the above-described pace assistance system, the pace assistance device may use the recorded pace data and thereby provide a corresponding output to the user consistent with the user's previous pace. In one example, the output may be a particular song that is set to pace (e.g. beats per minute) relative to the user's recorded pace. As noted above, this could include having a database or collection of songs at various BPM levels or adjusting an existing song or musical file by shifting the frequency of the song to the noted BPM level. Thereby, the runner can listen to a rhythm through a mobile audio device (e.g. MP3 player for example), where that rhythm corresponds to a previously recorded running pace, such as the examples of a pace of a previous training run, a pace of a previous race or even the example of a prospective training or racing pace the runner wishes to obtain.

Another example for sports or activities alternative to golf may also be cycling, where a user sets a pace relative to a cycling cadence. The above described running embodiment may similarly be utilized, where the cycling cadence can be determined by any number of possible pace determining devices, such as a modified pedometer that recognizes a full peddle motion or even the example of a power meter installed on the bicycle itself.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

I claim:

1. A system for providing a golfer with a golf swing pace assistance, the system comprising:
    a pace determining device disposed on the golfer, the device operative to monitor a walking pace of the golfer and calculate pace data relating to the walking pace of the golfer;
    a data storage device operative to store the pace data therein;
    a pace assistance device operative to retrieve the pace data from the storage device, calculate a golf swing assistance pace for the golfer over a defined time interval and transmit an output signal reflecting the golf swing assistance pace based on the pace data; and
    an output device operative to receive the output signal and generate an output signal synchronized with the golf swing assistance pace such that the golfer can swing a golf club consistent with the golf swing assistance pace.

2. The system of claim 1, wherein the pace determining device includes a pedometer.

3. The system of claim 1 further comprising an output router operative to route said output signal to a plurality of user-selectable output devices.

4. The system of claim 1 wherein said output device includes at least one of: a speaker, a vibrating device and a visual display.

5. The system of claim 1, wherein the walking pace includes a real-time average stride rate of the golfer over the defined time interval.

6. The system of claim 1 further comprising:
an output signal data storage device including a plurality of output signals at a plurality of paces stored therein, the pace assistance device further operative to retrieve one of the output signals at a pace consistent with the assistance pace and outputting the selected signals to the output device.

7. A method for pace assistance with a golf swing, the method comprising:
monitor a walking pace of a golfer during the performance of playing golf and calculate pace data relating to the walking pace of the golfer;
in response to a first signal, storing said pace data;
in response to a second signal, retrieving said pace data;
calculating a golf swing assistance pace for the golfer over a defined time interval; and
transmitting an output signal synchronized with the golf swing assistance pace and based the pace data, such that the golfer can swing a golf club consistent with the golf swing assistance pace.

8. The method of claim 7 wherein transmitting an output signal comprising routing said output signal to a plurality of user-selectable output devices.

9. The method of claim 7 wherein transmitting an output signal comprises transmitting said output signal to at least one of: a speaker, a vibrating device and a visual display.

10. The method of claim 7 wherein said golfer's pace relates to a walking pace of the golfer, including the real-time average stride rate of the golfer over a defined time interval.

11. The method of claim 7 further comprising:
storing a plurality of output signals at a plurality of paces; and
retrieving one of the output signals at a pace consistent with the golf swing assistance pace and outputting the selected signals to the output device.

* * * * *